(12) United States Patent
Takahashi et al.

(10) Patent No.: US 7,686,487 B2
(45) Date of Patent: Mar. 30, 2010

(54) DOOR MIRROR EQUIPPED WITH LAMP BODY

(75) Inventors: Yoshihiro Takahashi, Kiryu (JP); Yosuke Fukasawa, Kiryu (JP); Motosuke Ishizawa, Kiryu (JP); Takao Umezawa, Ota (JP)

(73) Assignee: Mitsuba Corporation, Kiryu-shi (JP)

( * ) Notice: Subject to any disclaimer, the term of this patent is extended or adjusted under 35 U.S.C. 154(b) by 96 days.

(21) Appl. No.: 11/503,176

(22) Filed: Aug. 14, 2006

(65) Prior Publication Data

US 2006/0274543 A1 Dec. 7, 2006

Related U.S. Application Data

(63) Continuation-in-part of application No. 10/525,243, filed as application No. PCT/JP2004/003891 on Mar. 22, 2004, now Pat. No. 7,278,767.

(30) Foreign Application Priority Data

Mar. 25, 2003 (JP) ............................. 2003-082806

(51) Int. Cl.
*B60Q 1/00* (2006.01)
*B60Q 1/26* (2006.01)
*B60R 1/12* (2006.01)
*B62C 1/00* (2006.01)

(52) U.S. Cl. .................. 362/494; 362/492; 362/501; 296/1.11

(58) Field of Classification Search ............. 362/494, 362/498, 487, 501, 506; 296/1.11
See application file for complete search history.

(56) References Cited

U.S. PATENT DOCUMENTS

| | | | |
|---|---|---|---|
| 4,809,137 A * | 2/1989 | Yamada ...................... 362/494 |
| 5,490,049 A * | 2/1996 | Montalan et al. ............ 362/240 |
| 5,660,457 A | 8/1997 | Lyons |
| 5,669,699 A * | 9/1997 | Pastrick et al. .............. 362/494 |
| 5,863,116 A | 1/1999 | Pastrick et al. |
| 6,086,229 A | 7/2000 | Pastrick |
| 6,099,153 A | 8/2000 | Zimmermann et al. |
| 6,139,171 A * | 10/2000 | Waldmann .................. 362/494 |
| 6,176,602 B1 | 1/2001 | Pastrick et al. |

(Continued)

FOREIGN PATENT DOCUMENTS

JP A 9-263179 10/1997

(Continued)

*Primary Examiner*—Jacob Y Choi
*Assistant Examiner*—David J Makiya
(74) *Attorney, Agent, or Firm*—Oliff & Berridge, PLC

(57) ABSTRACT

A door mirror comprising a mirror portion and a side blinker which is one example of lamp bodies allows easily performed maintenance for the side blinker. It is also structured so as to make a lamp body elongated in lateral dimension. A second opening is formed on the back side of a mirror housing with fixing pieces formed on the second opening. A lamp unit integrates a lens portion with the back face of a base body having an inner base and an outer base which covers the front face of the inner base and is structured so that the base end side avoids the vehicle body mounting portion. The lamp unit is inserted into the second opening through the back face side of the mirror housing, and fixing pieces on the lamp unit and the mirror housing-fixing pieces are tightened by screws.

19 Claims, 12 Drawing Sheets

U.S. PATENT DOCUMENTS

| | | | |
|---|---|---|---|
| 6,250,783 B1 | 6/2001 | Stidham et al. | |
| 6,250,784 B1 | 6/2001 | Kayama | |
| 6,517,227 B2 | 2/2003 | Stidham et al. | |
| 6,561,685 B2 | 5/2003 | Weber et al. | |
| 6,595,670 B2 * | 7/2003 | Sakamoto et al. | 362/494 |
| 6,637,917 B2 * | 10/2003 | Schwanz et al. | 362/487 |
| 6,832,848 B2 | 12/2004 | Pastrick | |
| 6,897,614 B2 * | 5/2005 | Matsumoto et al. | 315/84 |
| 6,926,432 B2 * | 8/2005 | Rodriguez Barros et al. | 362/494 |
| 7,140,756 B2 * | 11/2006 | McCloy et al. | 362/494 |
| 7,281,822 B2 * | 10/2007 | Seguchi et al. | 362/249 |
| 2001/0010633 A1 * | 8/2001 | Apfelbeck | 362/494 |
| 2001/0046136 A1 * | 11/2001 | Weber et al. | 362/494 |
| 2002/0057575 A1 * | 5/2002 | Schwanz et al. | 362/487 |
| 2003/0147253 A1 * | 8/2003 | Shy | 362/545 |
| 2004/0008519 A1 * | 1/2004 | Todaka et al. | 362/487 |
| 2004/0252518 A1 * | 12/2004 | Iwai et al. | 362/487 |
| 2005/0254251 A1 * | 11/2005 | Chou | 362/494 |

FOREIGN PATENT DOCUMENTS

| | | |
|---|---|---|
| JP | A 2002-079878 | 3/2002 |
| JP | A 2002-337606 | 11/2002 |

* cited by examiner (A)

(B)

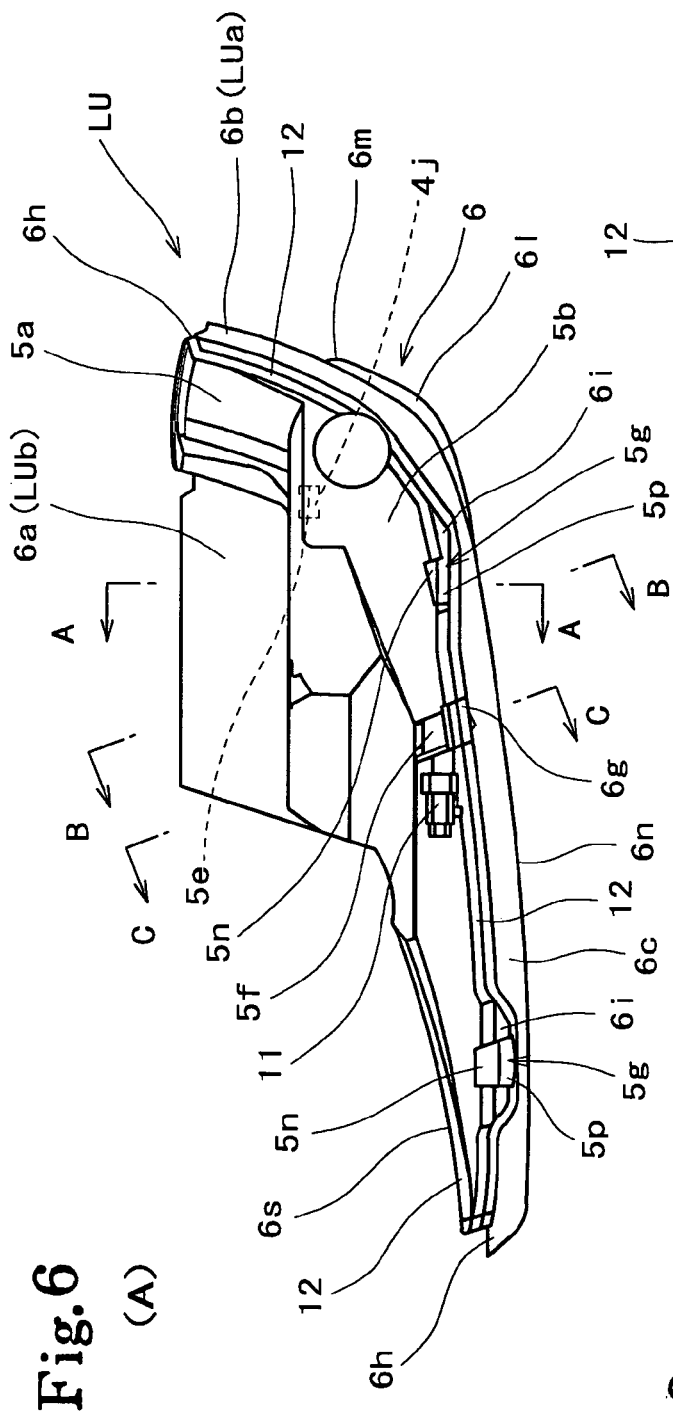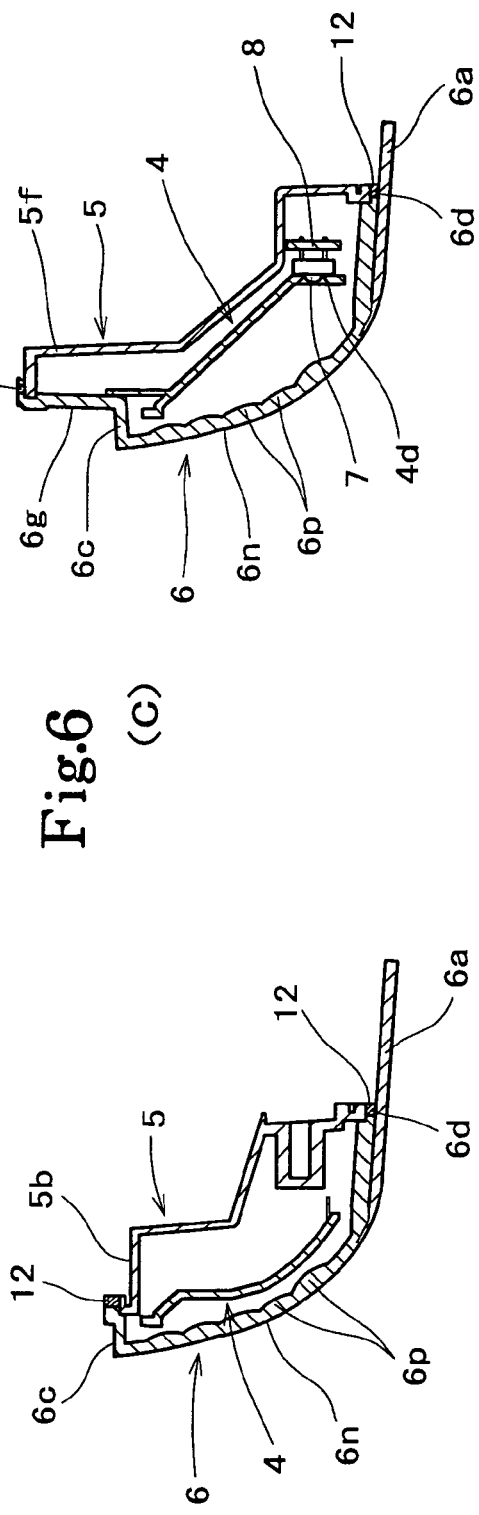
Fig.6 (A)
Fig.6 (B)
Fig.6 (C)

(A)

(B)

DOOR MIRROR EQUIPPED WITH LAMP BODY

INCORPORATION BY REFERENCE

This application is the U.S. National Stage of PCT/JP2004/003891 filed Mar. 22, 2004 which claims priority from JP 2003-082806 filed Mar. 5, 2003, the disclosures of which are incorporated in their entireties herein.

This application is a Continuation-In-Part of U.S. patent application Ser. No. 10/525,243 filed Feb. 22, 2005, the disclosure of which is incorporated in its entirety herein.

BACKGROUND

The disclosure relates to the technical field of a door mirror equipped with a lamp body to be mounted on the door of an automobile.

In general, some door mirrors of this type are known as those into which a lamp body, such as a side blinker (a side-turn-lamp), has been assembled. And, in this kind of door mirror, when a lamp body is applied to a side blinker and the side blinker is inserted into the projecting outer end side of a door mirror laterally protruded from the side of an automobile a favorable blinker fixing point is secured because visibility is improved for passengers.

Proposed as such a door mirror is, for example, a door mirror wherein boards having light sources are fixed to a base, a lens covering this base is integrated to form a side blinker portion. The side blinker portion is attached to an opening formed on a door mirror housing, which is a body of the door mirror (for example, refer to JP-A No. 2002-79878).

In the door mirror claimed in the above-described JP-A-2002-079878, the side blinker portion, which is to be provided in the housing of the door mirror in such a state that it is positioned on the back-face side of the mirror portion, is assembled thereinto from the side where the mirror portion is disposed (from the front-face side), and the side blinker is structured so as to be fixed to the door mirror housing by engaging an outer peripheral edge portion of the side blinker with a marginal opening portion provided on the door mirror housing and by screwing fixing pieces disposed on the mirror portion side of the side blinker portion onto support portions of the door mirror housing.

SUMMARY

Therefore, the side blinker portion must be assembled before assembly of the mirror portion. Such a structure makes it necessary to remove the mirror portion before removal of the side blinker portion when only the side blinker is replaced due to lamp burnout or breakage of the light source(s) of the side blinker. Therefore, each replacement of a side blinker is troublesome and complicated, resulting in poor maintenance performance. Therein exist the problems to be solved. There exists a side blinker portion that is formed long laterally (horizontally) for securing visibility. In this side blinker portion, for example, a part to be mounted on the body in a door mirror housing which covers the front face side becomes an obstacle causing difficulty in mounting.

This invention has been made to solve these problems in view of circumstances described above. According to the invention, a door mirror equipped with a lamp-body, comprising a housing having a mirror side to which a mirror is attached and a swelling side swelling from the mirror side, wherein an opening is formed on the swelling side of the housing, and a lamp body having a light source provided at the opening, wherein the lamp body is incorporated onto the housing on the swelling side in a state that the lamp body is in contact with the housing. It thereby becomes possible to mount the lamp body easily and provide excellent maintenance features.

According to the invention, the lamp body is provided horizontally and laterally on a lower half of the housing. Thereby, it becomes possible to improve design characteristics.

According to the invention, the lamp body is provided with a slant portion where a lower edge is slanted toward an upper edge so that a shape is formed that is sharply tapered toward a base-end side, which is a door mounting side. Thereby, the lamp body is mounted on the housing so as to avoid a door-mounting portion, making it possible to easily provide the lamp body laterally along the housing.

According to the invention, a cover body is provided which covers the opening on the swelling side and the lamp body. Thereby, it becomes possible to improve water proofing characteristics and design characteristics by securely covering the opening on the swelling side.

According to the invention, the lamp body is provided flush with the cover body, and thereby, it becomes possible to improve design characteristics.

According to the invention, the lamp body is provided with a lamp-body bending portion in which a lateral external side is bent toward the mirror side. Thereby, the lamp body can be securely fixed to the housing.

According to the invention, the lamp-body bending portion is protruded laterally and outwardly. Thereby, it becomes possible to easily emit light approximately toward the front face.

According to the invention, the lamp body is provided with a lower face portion constructing a lower face of the door mirror. Thereby, it becomes possible to improve design characteristics.

According to the invention, the lower face portion is non-translucent. Thereby, it becomes possible to prevent leakage of light emitted from the lamp body into the driver side.

According to the invention, the lamp body is constructed into a lamp unit by integrally forming a lens portion covering a back face of an inner base on a base body, said base body comprising the inner base exposing a light source from the back face and having a reflector on the back face and an outer base covering a front face of the inner base and internally having a board for supplying power to the light source between the inner base and the board. Thereby, the lamp body can be easily mounted on the housing, without taking into account water proofing characteristics or design characteristics.

According to the invention, the inner base is provided with through-holes passing through the light source for exposure. Thereby, it becomes possible to mount a board for mounting the light source so as not to be visible from the back face.

According to the invention, the inner base is provided with a swelling and protruding portion swelling toward the back face. Thereby, the light source is easily arranged in any appropriate direction, thereby making it easy to reflect light.

According to the invention, the swelling and protruding portion is provided with through-holes on an external face swelled laterally. Thereby, it becomes possible to easily emit light to the direction outside the door mirror.

According to the invention, a plurality of the swelling and protruding portions are provided and through-holes are formed at a concave portion between adjacent swelling and protruding portions. Thereby, it becomes possible to emit light by using the reflector for reflecting the light at the protruding portion.

According to the invention, the inner base is provided with an extending portion having a lateral external side bent toward the mirror side for extension and swelling, and protruding portions are provided on the extending portion. Thereby, it becomes possible to emit light outwardly and backwardly.

According to the invention, a plurality of boards are provided in opposition to the through-bores.

According to the invention, the board is composed of a single member.

According to the invention, the inner base is provided with engaging claws for latching the board with an appropriate space left between the board and the front face. Thereby, it becomes possible to adjust the height of the stopper nails whenever necessary, thereby giving an appropriate space between the inner housing and the board.

According to the invention, the outer base is non-translucent. Thereby, it becomes possible to prevent leakage of light emitted from the light source into the driver side.

According to the invention, the lens portion comprises a back face portion extending laterally and outwardly from a base end and a side face portion bending from the back face to the mirror side and leading to a protruding front end, and the back face portion and the side face portion are provided with a dispersion portion for dispersing light emitted from the light source.

According to the invention, the dispersion portion is formed at the back face portion as a protruded strip facing in a lateral direction and at the side face portion as a protruded strip facing in a longitudinal direction. Thereby, it becomes possible to provide a longitudinal dispersion in a backward direction and a horizontal dispersion in an outward direction, thereby providing a lamp body-equipped door mirror excellent in visibility.

According to the invention, a protruding portion is formed at the side face portion, which protrudes laterally and outwardly in a state continuing from the back face portion. Thereby, light can be emitted from the protruding portion approximately toward the front face.

BRIEF DESCRIPTION OF DRAWINGS

The invention will be described with reference to the drawings in which:

FIGS. 6 (A), 6 (B) and 6 (C) are respectively a plan view of the lamp unit, 6B-6B cross-sectional view and 6C-6C cross-sectional view of FIG. 6 (A);

DETAILED DESCRIPTION OF PREFERRED EMBODIMENT

An exemplary embodiment will be described on the basis of the drawings given in FIGS. 1 through 12.

Figure 1:
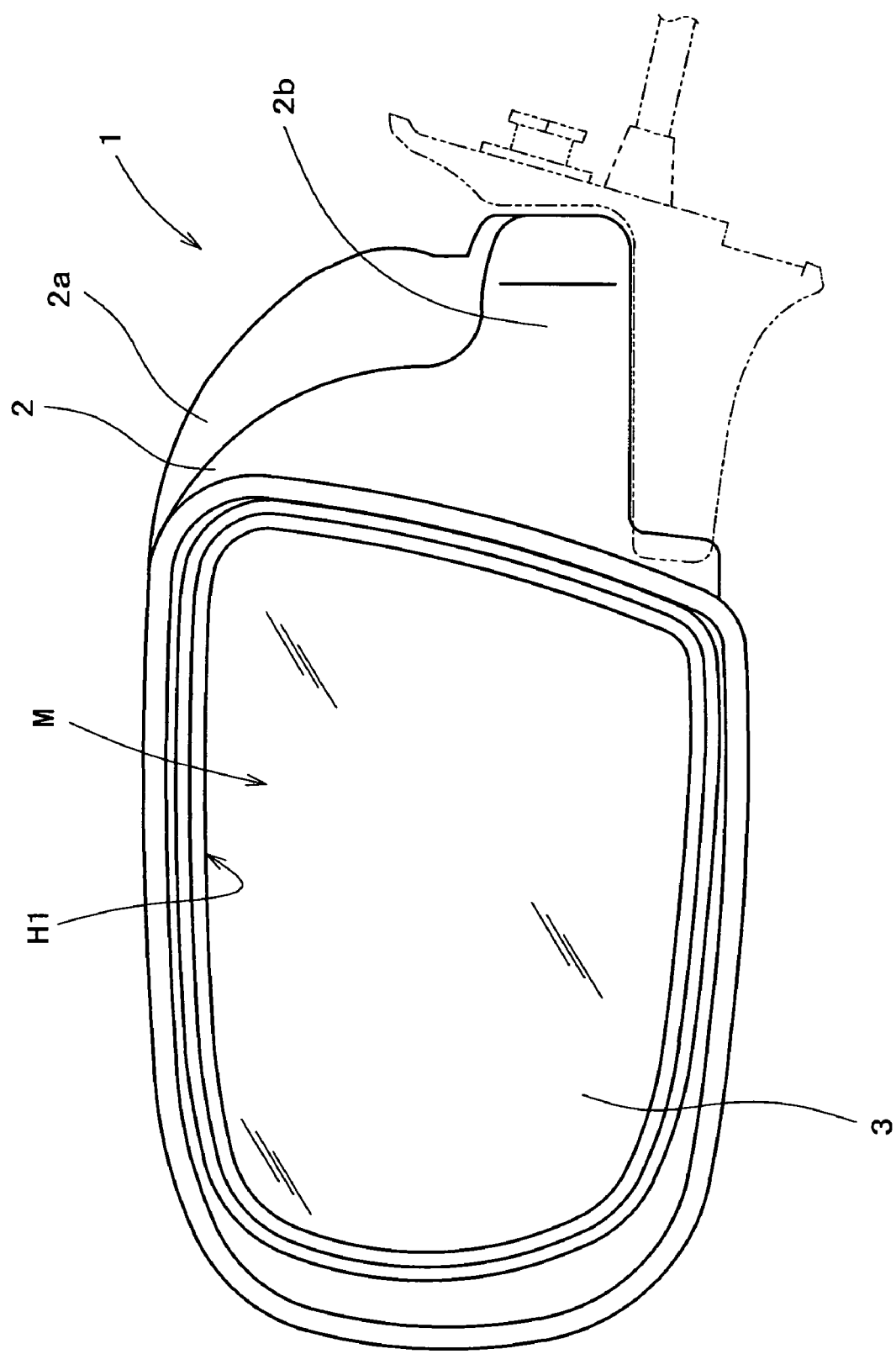
FIG. 1 is a front view of a door mirror.

In the drawings, 1 represents a pair of left and right door mirrors mounted on the driver's door and on the passenger's door in a passenger vehicle, and these door mirrors 1 are formed in a linear symmetrical state. The door mirror 1 illustrated in FIG. 1 represents a front (forward looking) view of a door mirror mounted on the passenger's door of an automobile with a right-hand steering wheel when being viewed from behind. The door mirror 1, as in the present embodiment, is provided with, together with a mirror portion M for a driver's rear view confirmation, a side blinker portion S (FIG. 2) (a direction indicator), which is provided at the lower half of the back face side of the mirror M, for indicating a driving direction of a vehicle by lighting of its horizontally protruding end portion (an external-end portion).

A mirror housing 2 (a door mirror housing which corresponds to the housing of the disclosure) of the door mirror 1 is integrally molded with a resin material to provide a configuration of a curved container having a first opening H1 formed on its front face (surface) and having a swelling portion 2*a* swelling backward. And, in the first opening H1 on the front face, are disposed a mirror 3 of the mirror portion M and a mirror driving mechanism 3*a* (FIG. 12) mounted on the back face of the mirror 3, for automatically carrying out three-dimensional position control of the mirror 3. Furthermore, the swelling portion 2*a* on the back face of the mirror housing 2 is provided with a second opening H2 positioned at its lower side part, and into this second opening H2, the side blinker S is assembled. The second opening H2 corresponds to the opening on the swelling side of the present invention.

Moreover, a door mirror retractable mechanism (not shown) is incorporated in a door-side end portion 2*b* (a base-end portion) of the mirror housing 2, and the mirror 3 automatically changes its posture by turning, within a present angle range, between a practical using posture in which the mirror 3 faces backward and protrudes outwardly and a retracted posture in which the mirror 3 lies along the door on the basis of a drive of the door mirror retractable mechanism driven by a switch operation.

Figure 2:
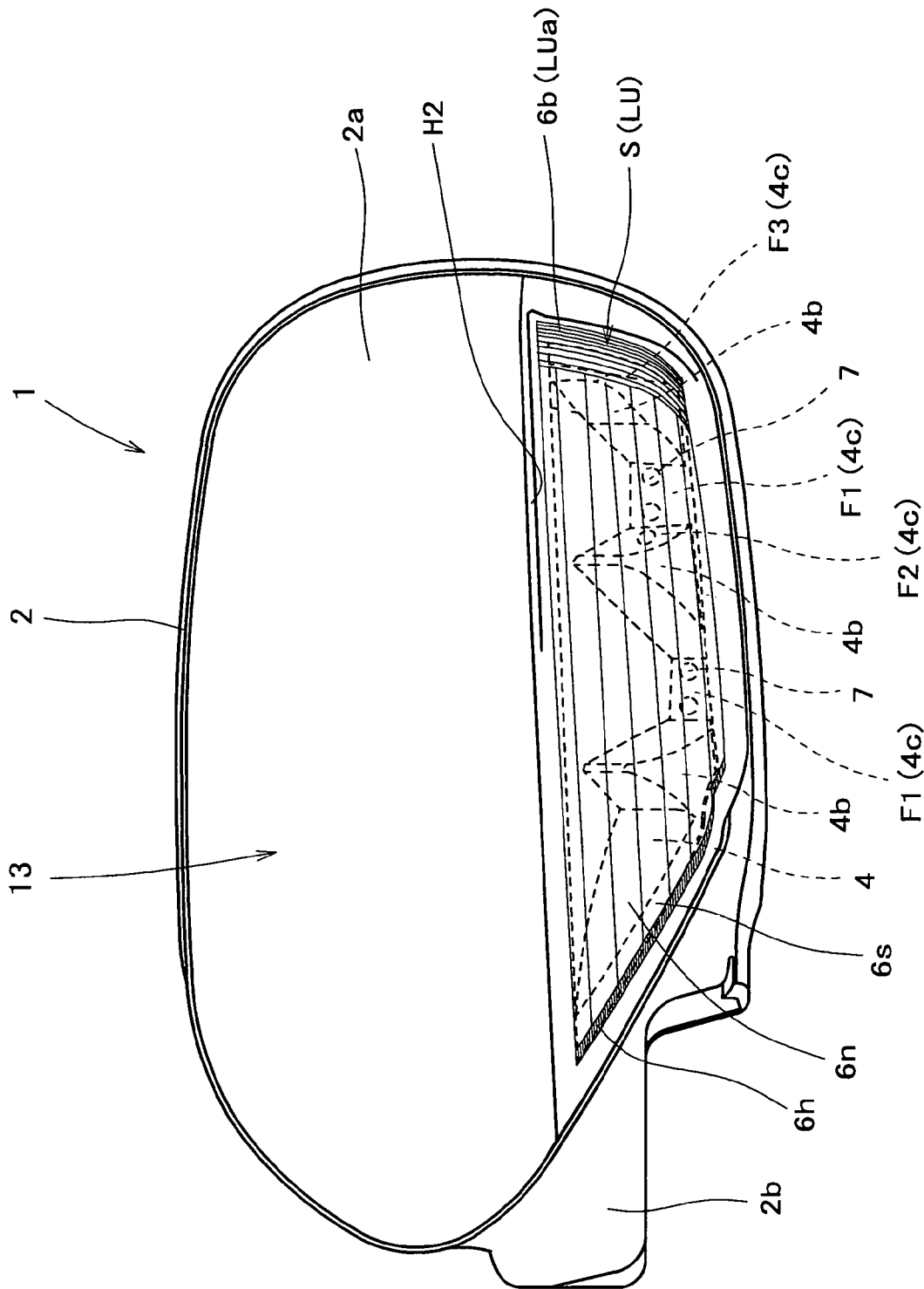
FIG. 2 is a rear view of a door mirror.
Figure 3:
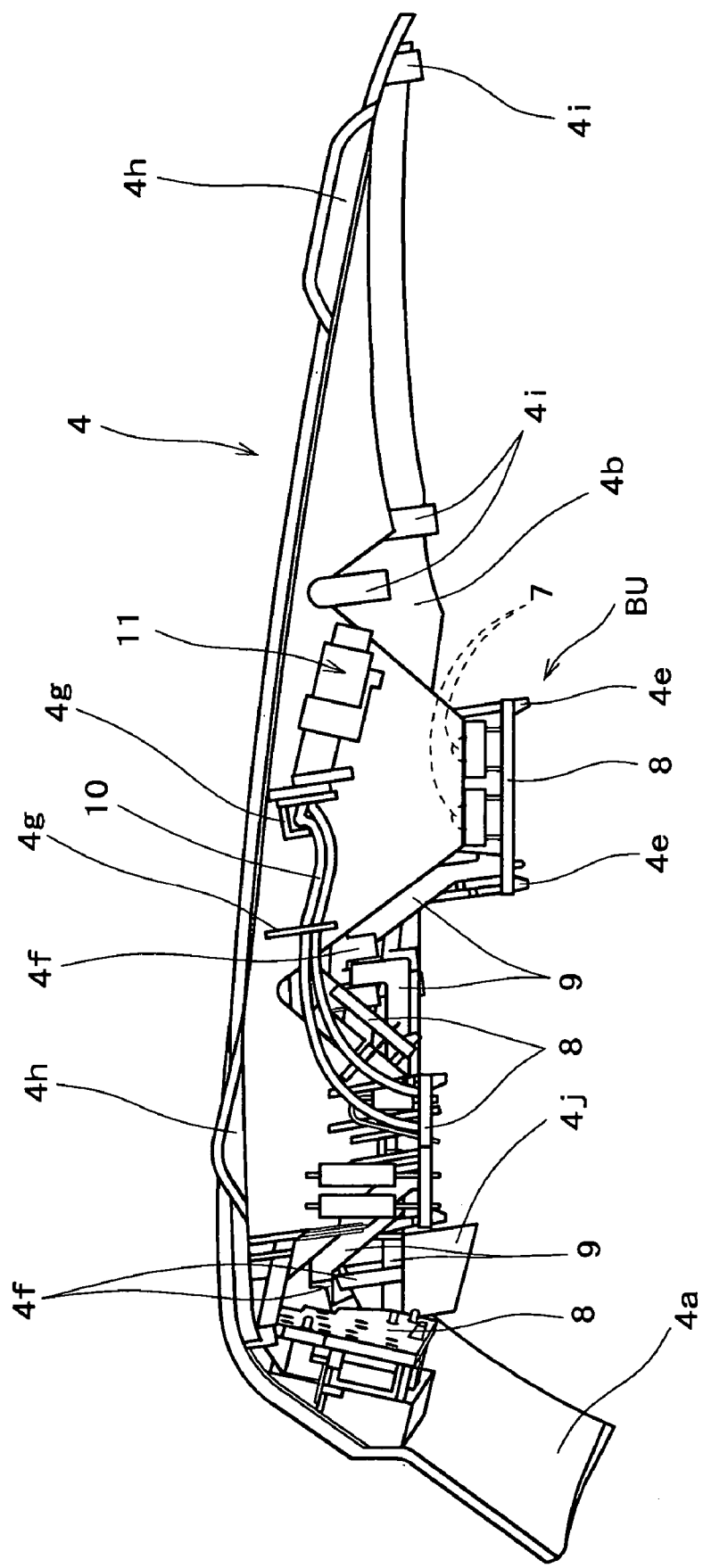
FIG. 3 is a plan view of the inner base.
Figure 4:
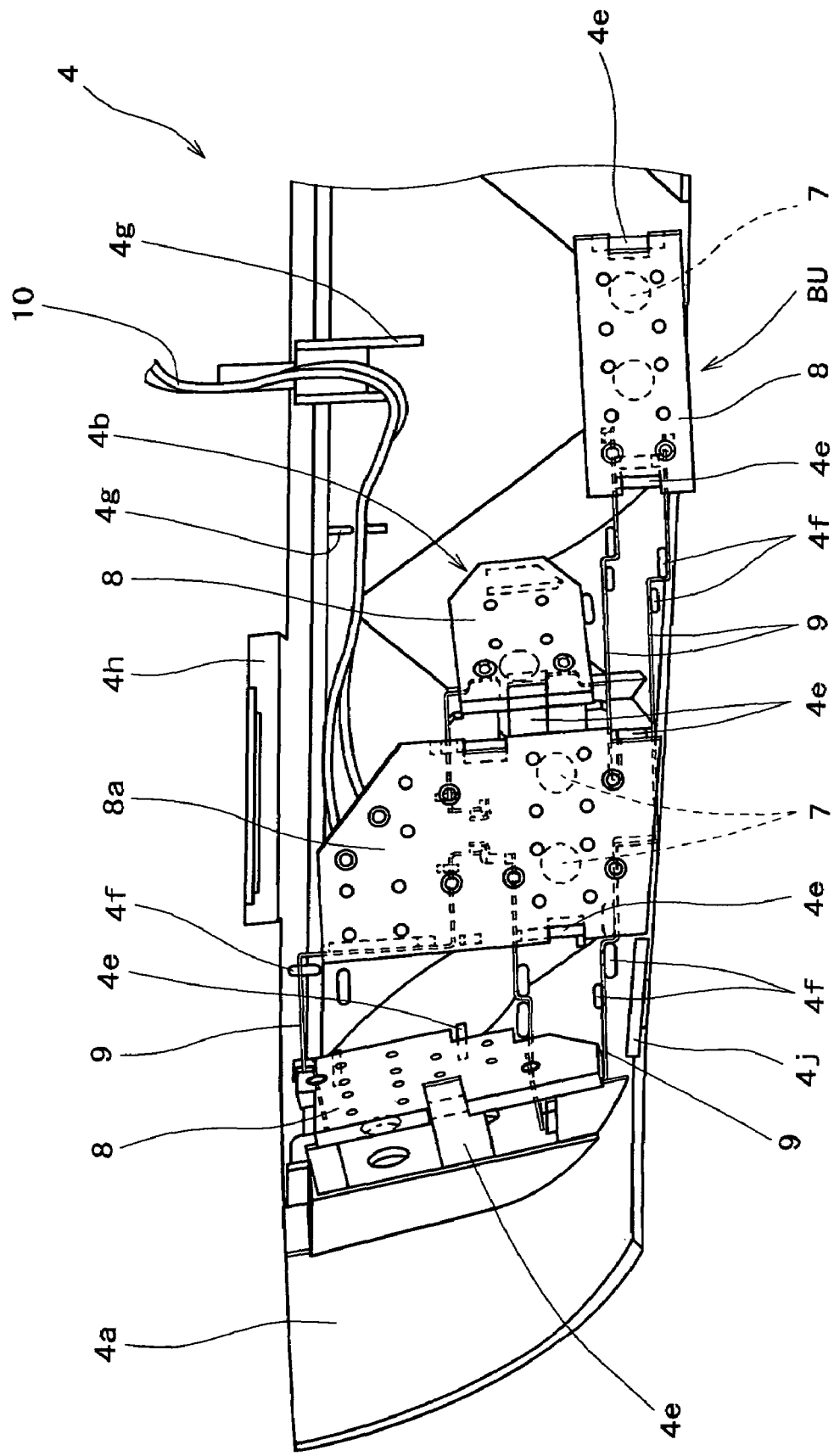
FIG. 4 is a partially enlarged front view of the inner base.
Figure 5:
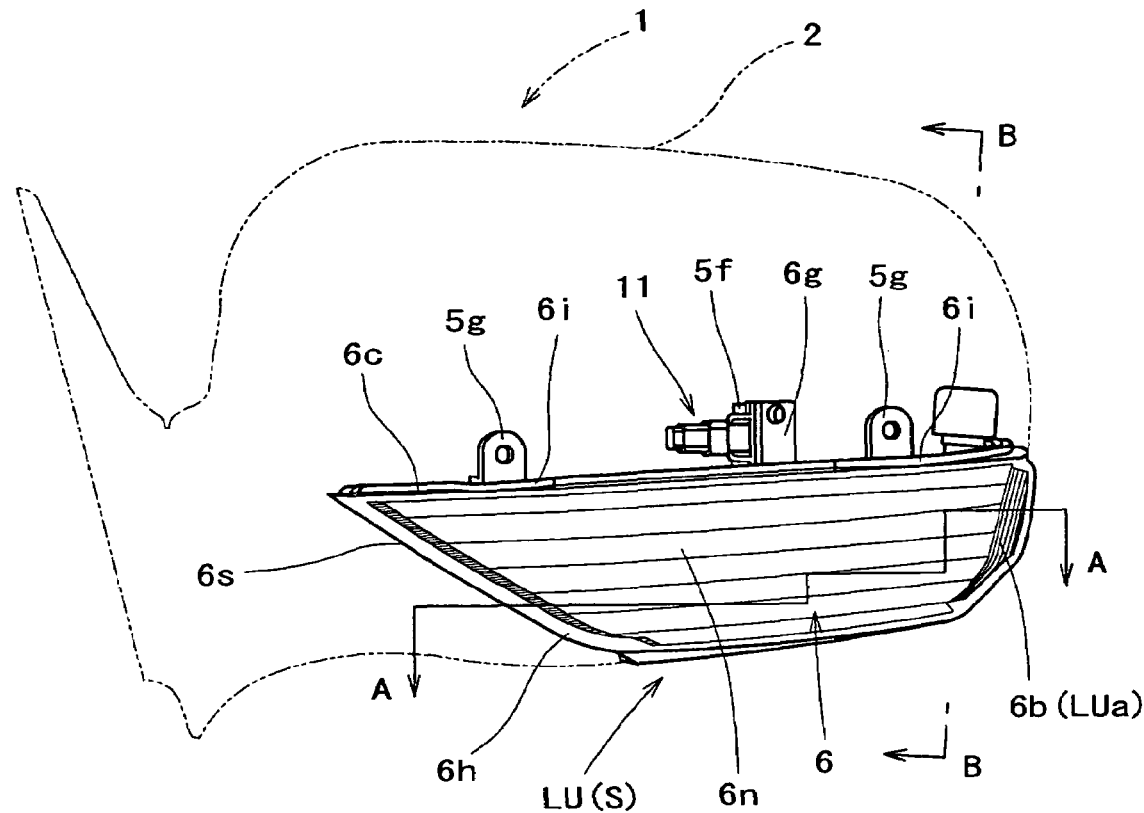
FIGS. 5 (A) and 5 (B) are respectively rear and front views of the lamp unit.
Figure 5:
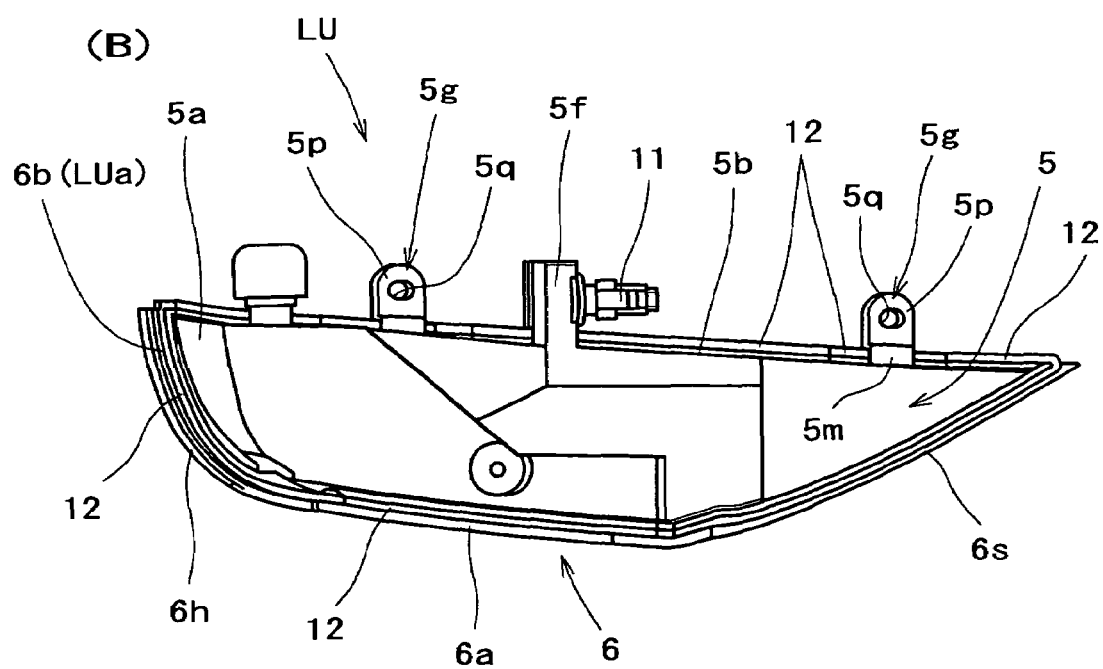

Herein, the side blinker portion S is composed of a lamp unit LU where the exemplary embodiment is carried out, and comprises an inner base 4, an outer base 5 (FIG. 5(B)), and a lens portion 6. The lamp unit LU is of a shape to be incorporated into a part extending from a door mounting side (base-end side) of the lower half of the mirror housing 2 to the end portion (front-end portion) protruded outwardly. As illustrated in FIG. 2, the lamp unit LU is assembled laterally along the mirror housing 2 and is horizontally elongated, and swells toward the back-face side. Further, the lamp unit LU is provided with, at its protruding front-end part, a lamp unit (lamp body) bending portion LUa curved from the back-face side to the front-face side and, at the base-end side part of the door mounting side, a slant portion 6*s* where a lower edge is slanted to an upper edge so that the shape is sharply tapered toward the base-end side. The slant portion 6*s* is formed so as to avoid the door mounting portion for mounting the door on the mirror housing 2.

Figure 8:
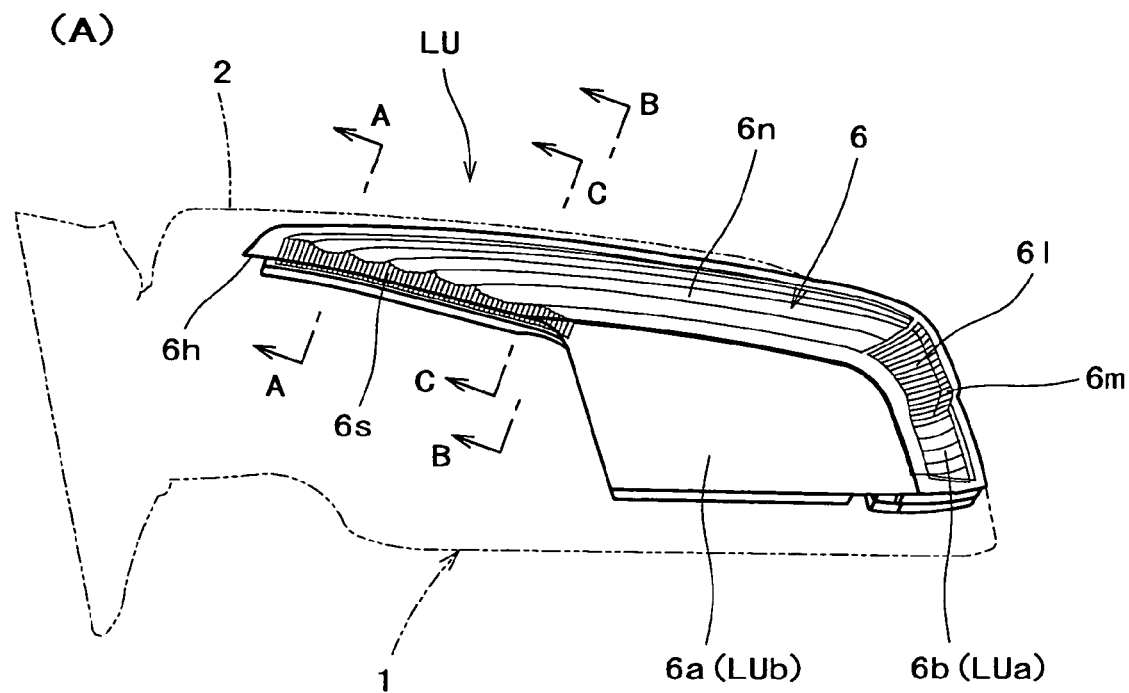
FIGS. 8 (A) and 8 (B) are respectively a bottom plan view of the lamp unit and a partially enlarged perspective view for explaining the upper edge portion of the lamp unit.
Figure 8:
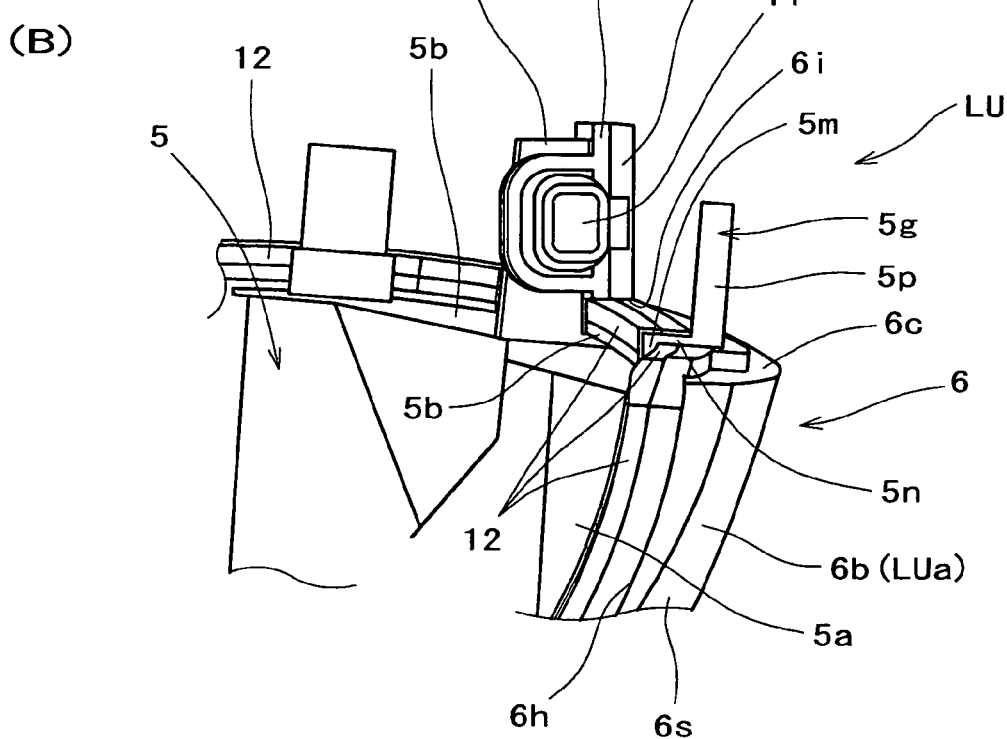
Figure 9:
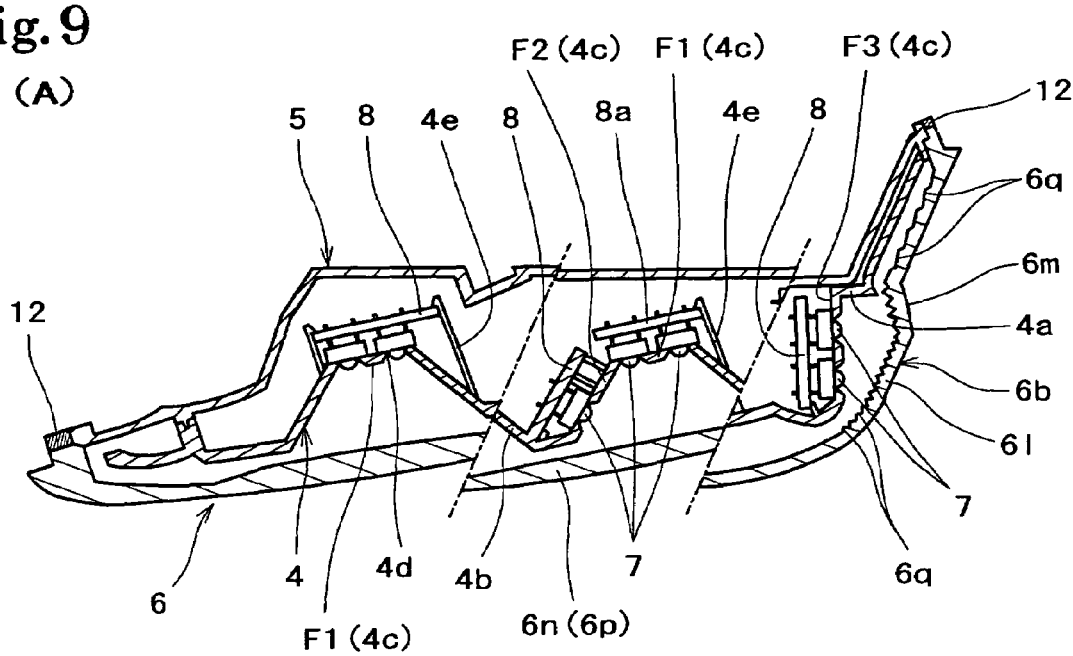
FIGS. 9 (A), 9 (B), 9 (C), 9 (D) and 9 (E) are respectively an 9A-9A cross-sectional view and 9B-9B cross-sectional view of FIG. 5(A) and an 9C-9C cross-sectional view, 9D-9D cross-sectional view and 9E-9E cross-sectional view of FIG. 8(A)
Figure 9:
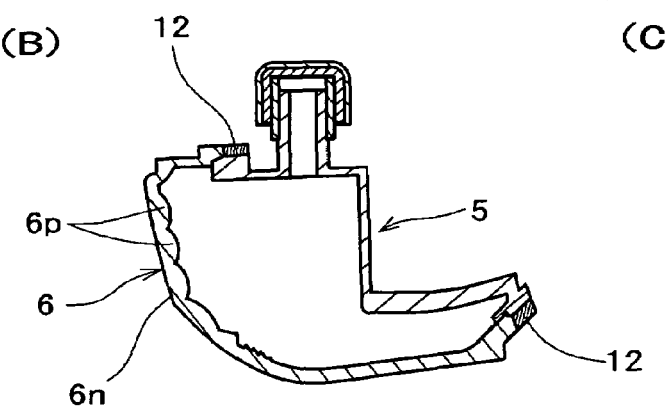
Figure 9:
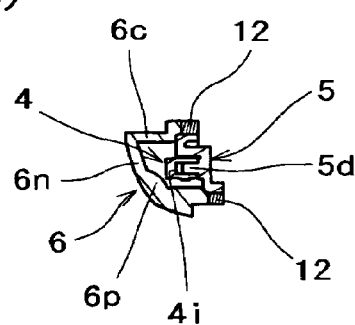
Figure 9:
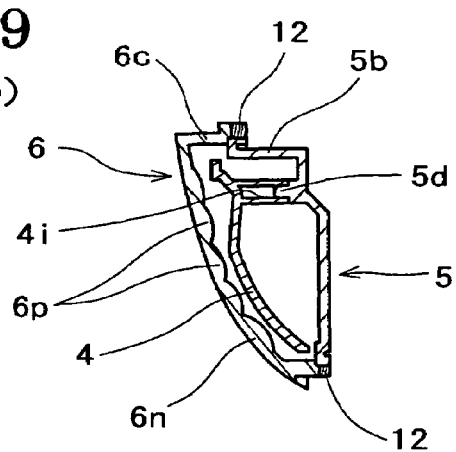
Figure 9:
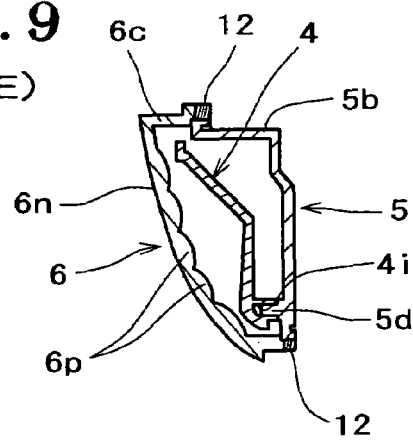
Figure 10:
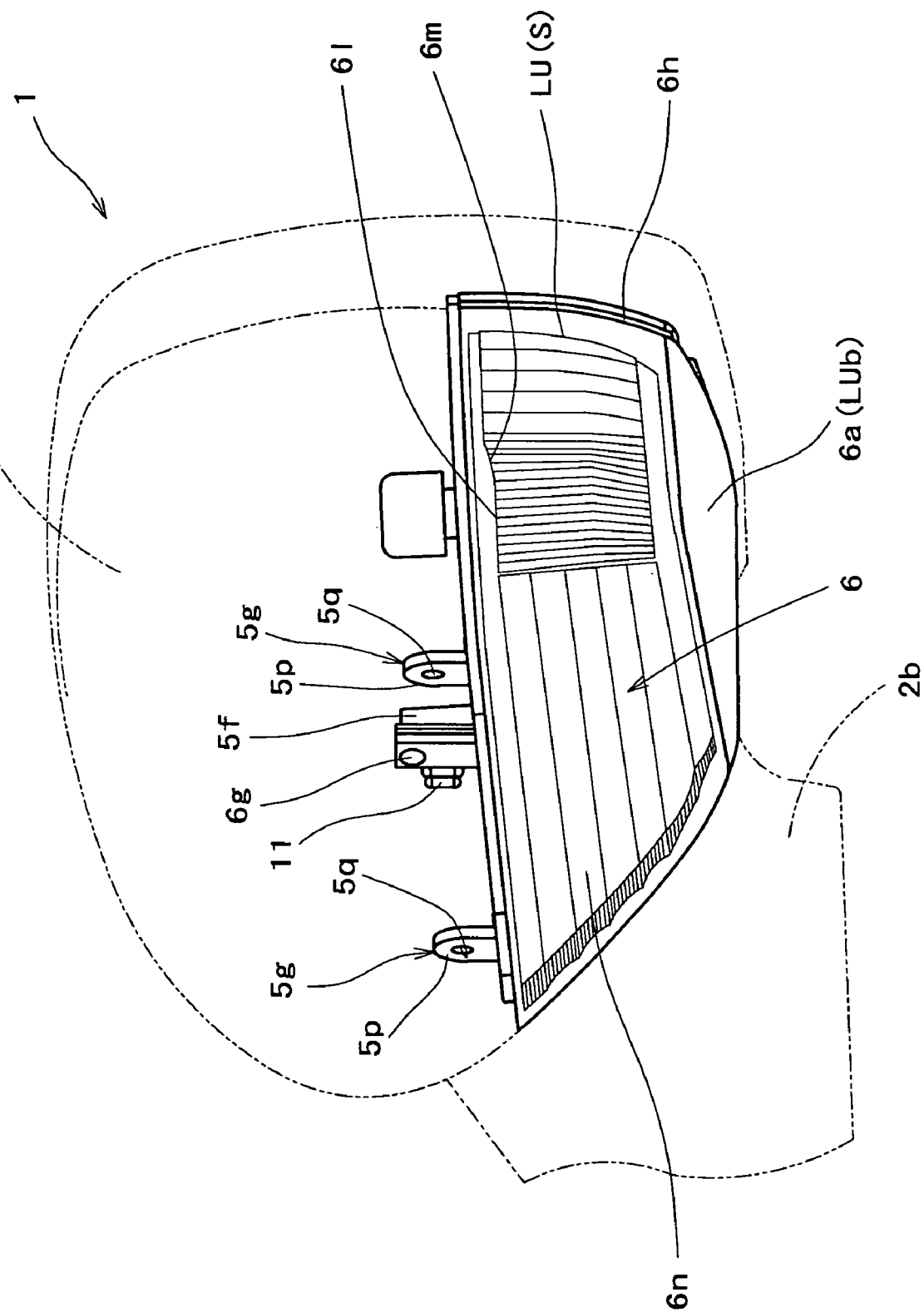
FIG. 10 is a perspective view of the door mirror.

The LUb illustrated in FIG. 8 (A) is a lower face portion of the lamp unit LU. In mounting the lamp unit LU on the mirror housing 2, the lower face portion LUb can be mounted along the bottom face of the mirror housing 2. Because the lower face portion LUb becomes a part of the lower face of a door mirror 1 in a state that it is mounted, water is less likely to enter into the door mirror 1 and design characteristics can also be improved. Further, because it is non-translucent, light is not leaked inside the automobile (to the driver side).

Figure 11:
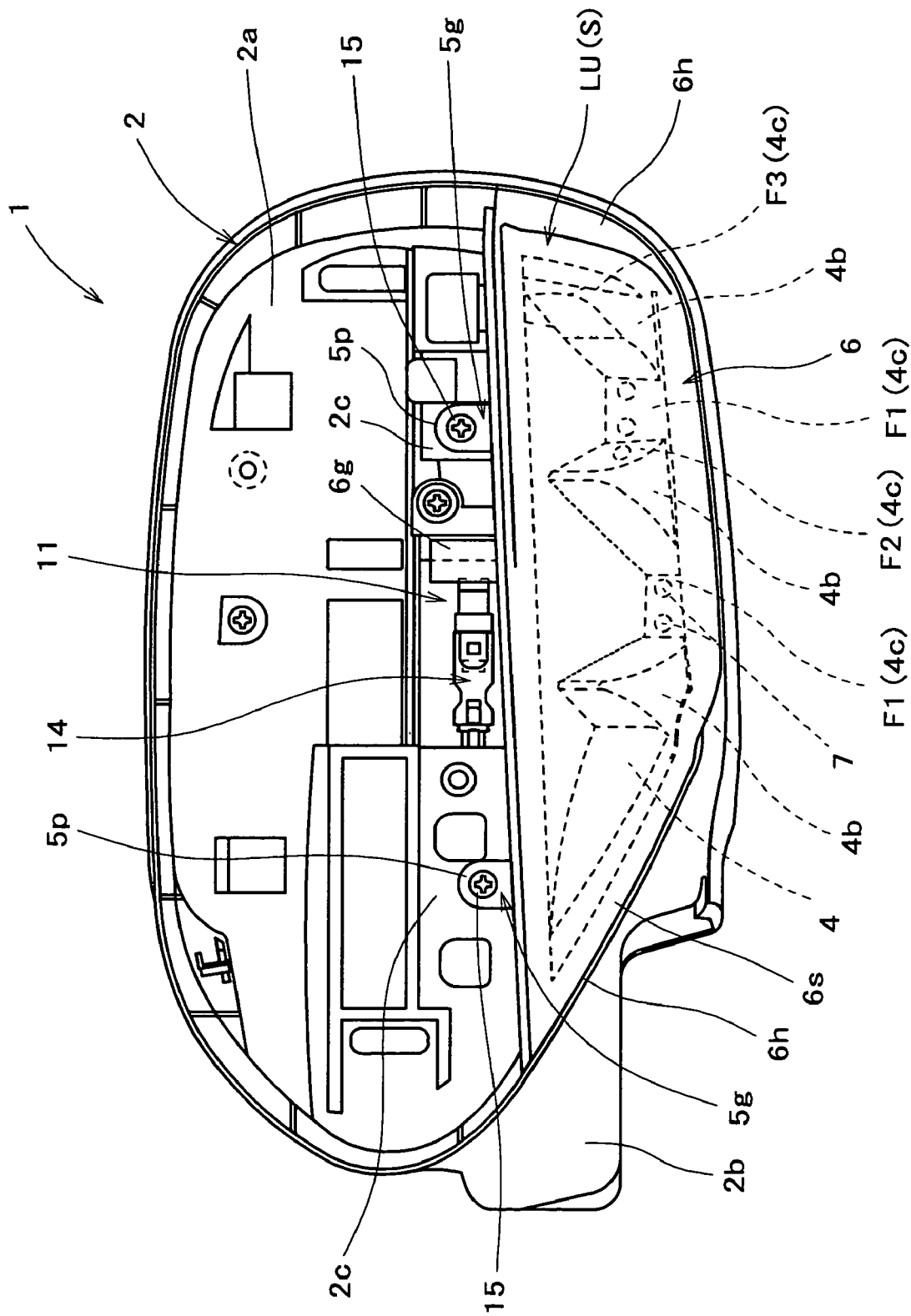
FIG. 11 is a rear view of the door mirror for explaining the lamp unit in a fixed condition.

Next, a description will be given of an inner base 4 of the lamp unit LU. The inner base 4 is integrally injection-molded through injection molding by using a light-impermeable resin material (a non-translucent resin material), wherein at a part corresponding to the protruding front-end portion, which is an end portion of the horizontally elongated body, an extending portion 4a (FIG. 3) is formed by bending from the back face side to the front face side and extending it, and the horizontally elongated face portion is provided with a swelling and protruding portion 4b swelling in a triangular shape toward the back-face side, with the lower-end portion used as a base, at three places. As illustrated in FIG. 2, FIG. 9(A) and FIG. 11, faces at the total of four places, F1, F2 and F3, namely, two lower-end faces F1 located between these swelling and protruding portions 4b, an external-side face F2 (front-end side) of the swelling and protruding portion 4b located at the center and an external-side face F3 of the swelling and protruding portion 4b located outside the extending portion 4a, are respectively facing in three-dimensionally different directions, and these faces are respectively structured as light source-attaching surfaces 4c (FIG. 9(A)). The light source-attaching surfaces 4c are individually provided with through-holes 4d in an appropriate number, so that respective front-end portions of light sources 7 (to be described later) are seen from the through-holes 4d and the light sources 7 are exposed to the back faces through the through-holes 4d. Then, the light source 7 is arranged in such a way that the light-emitting axis is approximately vertical to the face direction of the light source-attaching face 4c. The light source 7 provided on the lower end face F1 is arranged in such a way that the light-emitting axis is approximately in the backward direction, and the light source 7 provided on the external-side face F2 is arranged in such a way that the light-emitting axis is in an intermediate direction between the approximately backward direction and the outward direction (front end direction). Further, the light source 7 provided on the external-side face F3 is arranged in such a way that the light-emitting axis is approximately in an outward direction. In addition, the back face of the inner base 4 is covered with an aluminum coating, whereby the back face of the inner base 4 functions as a reflector for the light sources 7, which are exposed to the back-face side through the respective through-holes 4d.

On the other hand, the base-end portion of the light source 7, composed of a light-emitting diode, is mounted on a printed circuit board (hereinafter referred to as a board) 8 with wiring necessary for the emission of the light source 7. A different board 8 is individually provided for the light source(s) 7 mounted on each light source-attaching face 4c, that is, four boards 8 are provided in the exemplary embodiment. These four units of the board 8 are to be disposed on the front-face side of the inner base 4, and the respective boards 8 are, by being respectively assembled along their corresponding light source-attaching faces 4c, disposed on the inner base 4 in a condition where they are facing in three-dimensionally different directions. Moreover, power is supplied to the respective boards 8 facing in the different directions through a plurality of terminal strips 9 for connection between the boards 8, and the terminal strips 9 are formed by, for example, appropriately bending strips so as to follow the front face configuration of the inner base 4. Further, these boards 8 may be integrally formed in an appropriate shape and composed of a single member.

Herein, in the present embodiment, a plurality of boards 8, to which the light sources 7 are connected, are connected in advance via the terminal strips 9 bent according to the disposing places of the respective boards 8, and are thereby structured as a light source unit BU. The light source unit BU is assembled into the inner base 4. In the vicinity of the surface of each light source-attaching face 4c of the inner base 4 are a plurality of engaging claws 4e for engaging the boards 8. The engaging claws 4e, with protruding front ends, are formed in a protruding state in a direction approximately orthogonal to the respective light source attaching faces 4c. By engaging appropriate points, according to the shape of the respective board 8, with these respective engaging claws 4e, the boards 8 are fixed and supported while a designated gap exists between the boards 8 and the light source-attaching faces 4c. Furthermore, the inner base 4 is provided with a plurality of engaging pieces 4f for supporting the terminal strips 9, which are provided in a protruding fashion so as to follow the board faces of the terminal strips 9. Thereby, when the light source unit BU is assembled into the inner base 4, the terminal strips 9 are supported by the engaging pieces 4f and the boards 8 are fixed and supported by the engaging claws 4e, whereby an assembling condition of the light source unit BU into the inner base 4 is assuredly fixed.

In addition, of the above-described four boards 8, an arbitrary board 8a functions as a main board and the main board 8a is connected with necessary control components and lead wire 10 for connection with external power supply, in addition to the light source 7. The above-described terminal strips 9 individually connect the other boards 8 with the main board 8a. In the present embodiment, the lead wire 10, extending from the above-described main board 8a, is supported by the lead wire induction strip 4g formed on the inner base 4, so that the lead wire 10 is drawn out above the inner base 4. Further, 11 represents a coupler which is mounted on the front-end portion for drawing out the above-described lead wire 10 and is jointed with an external coupler 14 (FIG. 12) from an external power supply.

On the other hand, the above-described outer base 5 is molded as one piece through injection molding by using a light impermeable resin material (non-translucent resin material). The outer base 5 has a shape of covering the front face side of the inner base 4. At one end portion (at the front-end portion) of the horizontally elongated body, a side face portion 5a is formed by bending from the back face side to the front face side, and at an upper edge portion thereof, an upper piece portion 5b protruding to the back face is formed.

The end face on the back side which composes the outer base upper piece portion 5b is provided at two places in the horizontal direction with abutting piece portions 5c which are formed stepwise due to cutting on the plate thickness of the outer base 5. Furthermore, the back face of the outer base 5 is provided at three places with positioning protrusions 5d located at the slant portion on the base-end portion side and protruding toward the back face. The outer base 5 is also provided with a positioning concave 5e located at the lower edge adjacent to the side face portion 5a and regressed to the front face.

In contrast, the abutting receiving-piece portion 4h, corresponding to the retention piece, is formed in a state of protruding upward from the upper edge of the inner base 4 covered with the outer base 5. As will be described later, the abutting receiving-piece portion 4h is abutted both on the front and back faces by the abutting piece portion 5c of the outer base 5 and the lens portion 6, respectively, and installed to be held between them. Furthermore, the back face of the inner base 4 is provided with positioning concaves 4*i* located at the slant portion of the door assembly side and joined with a corresponding one of the above-described positioning protrusions 5*d*. A positioning protrusion 4*j* is also provided, which is located at the lower edge adjacent to the side face portion 4*a*, protruded to the front face and joined with the positioning concave 5*e*.

While the front face side of the abutting receiving-piece portion 4*h* is abutted against the inner abutting portion 5*r* which is a lower part of the stepwise abutting piece portion 5*c*, the positioning protrusions 5*d* on the front face side are fitted into the positioning concaves 4*i*, and the inner base 4 and outer base 5 are incorporated in a condition where the positioning protrusion 4*j* is fitted into the positioning concave 5*e*. Thus, the bases 4, 5 are respectively assembled in a positioned state and in a temporarily secured state. In the above-described assembled state, a space portion is formed between the inner base 4 and the outer base 5, and the above-described light source unit BU is accommodated into the space portion so that the boards 8 and the terminal strips 9 are not exposed to the outside of the bases 4, 5. In addition, the circumferential portion of the outer base 5 protrudes outwardly further than the circumferential portion of the inner base 4, and only the inner base abutting receiving-piece portion 4*h* is brought into contact against the upper face portion 5*b* of the outer base 5 in an anteroposteriorly laminated fashion.

The upper face portion 5*b* of the outer base 5 is provided with a coupler supporting piece 5*f* for drawing out the lead wire 10 directed to the upper edge side by the lead wire induction piece 4*g* of the inner base 4. The coupler supporting piece 5*f* is located between the above-described pair of abutting piece portions 5*c* and installed to accommodate the front end of the above-described lead wire 10 and the base-end portion of the coupler 11 connected with the front-end portion.

On the upper face portion 5*b* of the outer base, fixing pieces 5*g* are formed in a protruded manner to continue upwardly from the above-described pair of abutting receiving-piece portions 5*c*. The pair of fixing pieces 5*g* are respectively provided with a protruding base-end piece 5*m* erected upwardly from a front-face side part separated from the back-face end portion of the upper piece portion 5*b*, which is a lens joining edge of the outer base 5; a bent piece 5*n* extends from the front edge of the protruding base-end piece 5*m* to the back face side, which is a lens joining edge side; and an erected piece 5*p* extending from the front edge of the bent piece 5*n* upward in an erecting fashion, and is formed in a crank shape. Therefore, the mounting erected piece 5*p* for mounting the lamp unit LU on the mirror bracket 2 is lopsided to the lens joining edge side from the protruding base-end piece 5*m* and results in a positional relationship located above the lens joining edge. The fixing pieces 5*g* are provided with a rectangular space which is surrounded by the upper piece portion 5*b*, a protruding base-end piece 5*m*, and a bent piece 5*n*, is equipped with an opening on the back face, and as will be described later, the space serves as a flow path where an injection resin material 12 is filled in injection molding for integrating the base body with the lens 6. Further, 5*q* is a mounting hole provided in the erected piece 5*p*.

On the other hand, the lens portion 6 is integrally molded through injection molding by using a light permeable resin (translucent resin or transparent resin), excepting its lower face portion 6*a*. The lower face portion 6*a* is molded with a non-translucent resin material, and is provided with a back face portion 6*n* extending from the base-end side laterally and outwardly, a side face portion 6*b* formed by bending to the protruding front end from the back face portion 6*n* and an upper face portion 6*c* protruded from the upper edge portion to the front face side. The above-described lower face portion 6*a* extends to the front face side over assembly parts of the inner base 4 with the outer base 5, but is located at a portion along the lower edge of the outer base 5, and a flow path 6*d* is formed stepwise so that the molding resin material 12 due to injection can inflow.

Furthermore, on the upper face portion 6*c* of the lens portion 6, a coupler supporting piece 6*g* for constructing a coupler support along with a coupler supporting piece 5*f* formed on the outer base 5 is formed in an upwardly protruding fashion. The coupler supporting piece 6*g* of the lens portion serves as an injection incoming port for injection molding of the lens portion 6, thus making it possible to prevent the part for permeating the light source 7 of the lens portion 6 from being damaged due to traces on the injection incoming port.

Figure 7:
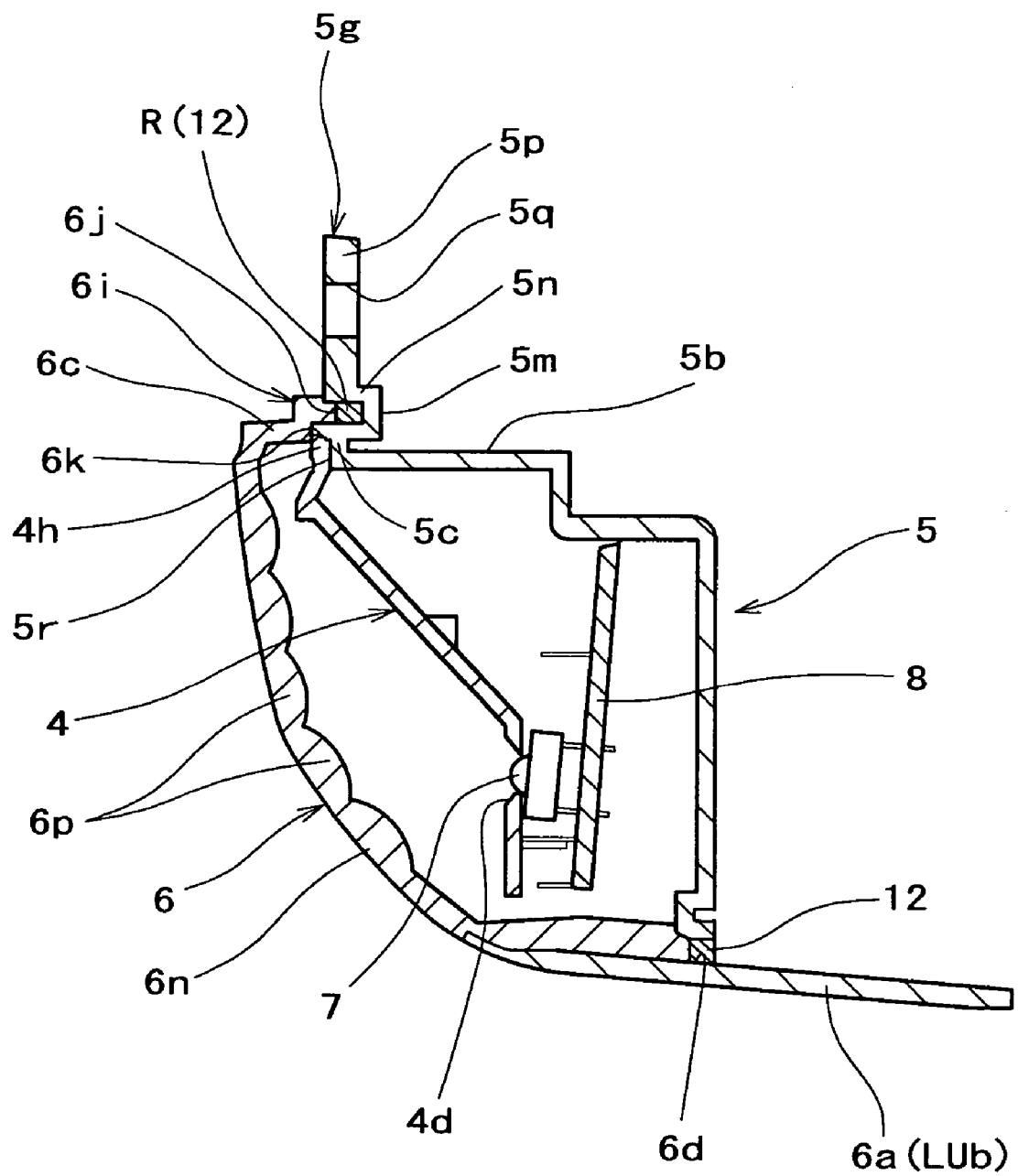
FIG. 7 is an 7-7 cross sectional view of FIG. 6 (A)

The upper face portion 6*c* of the lens portion 6 is also provided with abutting piece portions 6*i* opposed to the abutting piece portions 5*c* of the outer base 5 (FIG. 7). The lens abutting piece portion 6*i* is a portion where the outer abutting piece portion 6*j* is fitted in the end portion on the back side of the space R of the fixing piece 5*g* formed at the outer base abutting piece portion 5*c* and the inner abutting portion 6*k* abutted against the back face of the upper edge portion of the inner base abutting receiving-piece portion 4*h* are formed in a stepwise state. When the lens portion 6 and the base body are mated with each other, the inner abutting portion 6*k* is abutted against the inner base abutting receiving-piece portion 4*h* in a pressed manner, while the inner abutting portion 6*k* makes the outer abutting portion 6*j* of the lens abutting piece portion 6*i* and the protrusion base-end piece 5*m* of the fixing piece 5*g* are opposed to one another with a space therebetween. The opposing space is provided as a space portion R.

When the lens portion 6 is set in a mated state so as to cover the back face of the inner base 4 incorporated in advance with the outer base 5 for temporary retention, the peripheral edge portion (lens joining edge of the base body) of the outer base S which protrudes further outwardly than the periphery of the inner base 4 is abutted against the portion which is located further inwardly than the outer edge of the upper face portion 6*c* and the outer edge of the lower edge portion of the slant portion of the lens portion 6 (base body joining edge of the lens portion). A stepwise part, formed between the peripheral edge of the outer base 5 and peripheral edge of the lens portion 6 thus abutted, serves as a flow path for the injection resin material 12. The resin material 12, which is a non-translucent resin material, is injected into all flow paths around the circumference of the lamp unit LU. The flow paths are composed of the flow path provided on the circumference and a flow path 6*d* provided on the lower face portion 6*a* so as to unify the lens portion 6 with the base body composed of the inner base 4 and outer base S.

Furthermore, at this time, the coupler supporting piece 5*f* on the outer base side is abutted against the coupler supporting piece 6*g* on the lens portion side (FIG. 10), and the resin 12, which is injected for integrating the circumference of the base body with the lens portion 6, is filled into this part as well, thus simultaneously attaining an integration of the lens portion 6 with the base body at the part of the coupler supporting pieces 5*f*, 6*g*.

As mentioned above, during injection of the resin 12, at the part of the fixing piece 5*g*, the lens portion 6 is mated with the base body, whereby the opening back face of the above-described space R is opposed to the outer abutting portion 6*j* of the abutting receiving piece portion 6*i* of the lens portion 6.

The space R communicates with the stepwise flow path formed between the outer circumferential edge of the lens portion 6 and that of the outer base 5. Thereby, the resin material 12 injected around the whole circumference is filled into the above-described space R as well, and the lens portion 6 and the base body is sealed by the injection of the resin material, although the fixing pieces 5g (erected pieces 5p) for mounting the lamp unit LU are provided on the end portion (lens joining edge) on the back side of the upper face portion 5b of the outer base.

As described above, integration of the lens portion 6 with the base body by injection molding can be used not only for an integration at the part of the coupler supporting pieces 5f, 6g but also for an integration at the part for forming the fixing pieces 5g protruded outwardly from the outer base S, whereby a one time injection molding can seal the entire circumference of the lamp unit LU and higher water proofing performance is obtained.

Furthermore, in the above integration process, the abutting receiving-piece portion 4h of the inner base 4 is sandwiched in a pressed manner between the inner abutting portion 5r of the abutting piece portion 5c of the outer base 5 and the inner abutting portion 6k of the abutting piece portion 6i formed at the end face on the front face of the lens upper face portion 6c. In this condition, by integrating the outer base 5 and the lens portion 6 using the resin material 12, a condition where the abutting receiving-piece portion 4h is temporally retained by the outer base 5 can be changed to a fixed condition where the same is sandwiched between the outer base 5 and lens portion 6.

As illustrated in FIGS. 9(A)-9(E), the lens portion 6 is provided with dispersion portions 6p, 6q for dispersing light from the light source 7 respectively to a back face portion 6n and a side face portion 6b. The dispersion portion 6p is formed as a protruded strip in which laterally-long protruding portions are arranged parallel at the back face portion 6n, whereas the dispersion portion 6q is formed as a protruded strip in which vertically-long protruding portions are arranged parallel at the side face portion 6b. Therefore, light emitted from the light source 7 is radiated at the dispersion portion 6p and dispersed vertically, and then radiated at the dispersion portion 6q and dispersed mainly horizontally. The side face portion 6b is provided with a protruding portion 6l in which a portion opposing the side face F3 is protruded outwardly (front-end side) and a slant portion 6m slanting from the front face side of the protruding portion 6l to the inner side (base-end side). Therefore, when the slant portion 6m is radiated by the light emitted from the light source 7 arranged on the side face F3, it is able to emit light, with the light dispersed approximately toward the front face side. As a result, the light with better visibility is created for drivers of motorcycles and other two-wheeled vehicles which travel on the right or left side of an automobile.

Figure 12:
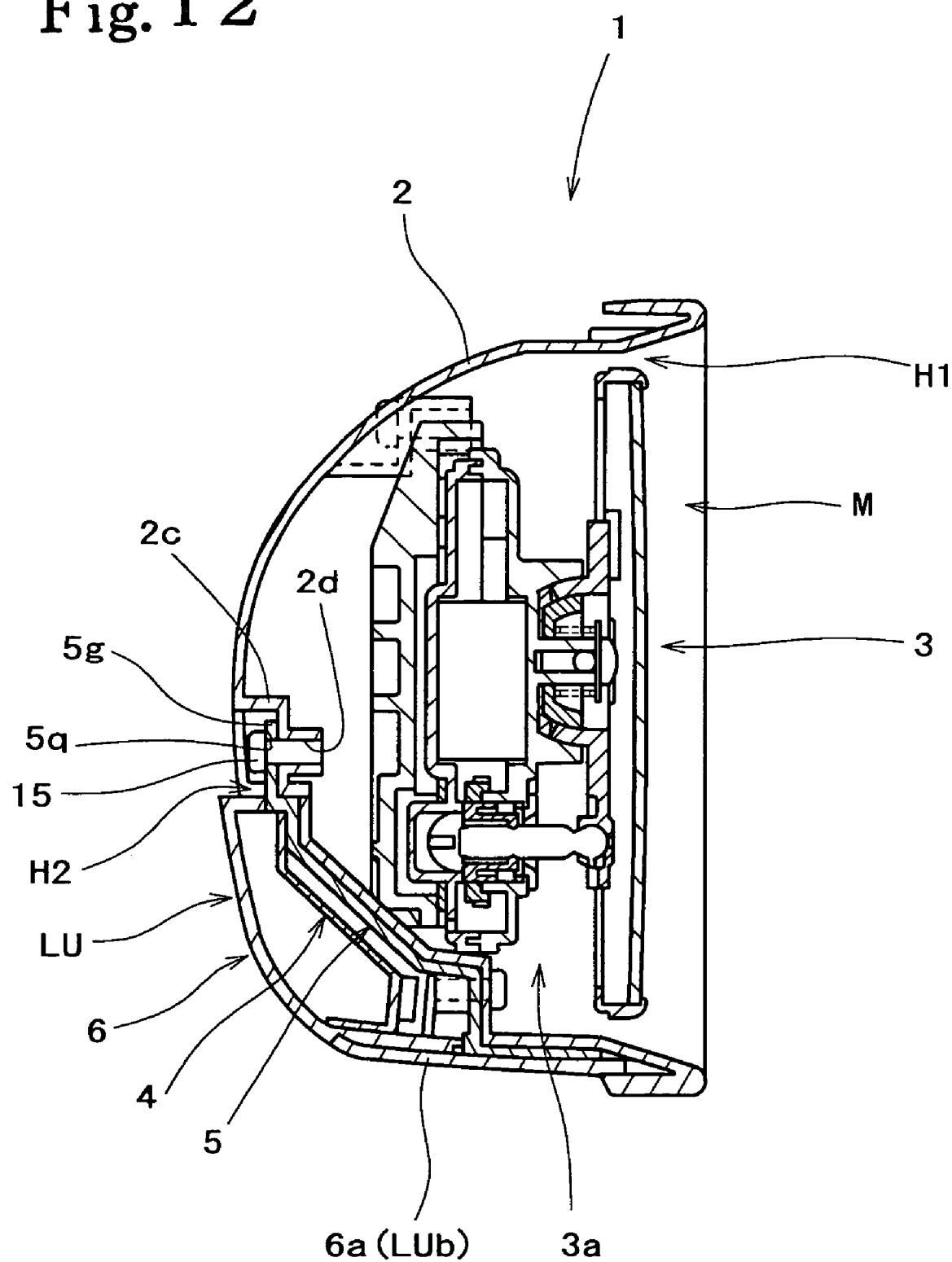
FIG. 12 is a cross-sectional view of the door mirror.

The lamp unit LU thus structured is fixed via the fixing pieces 5g to the mirror housing 2, and such fixation is performed as follows (FIGS. 11 and 12). The lamp unit LU is installed to be assembled into the second opening H2 provided at the back face of the mirror housing 2 from its back face side (toward the front of the vehicle), with the lens portion 6 oriented toward the back face side. The fixing pieces 5g of the lamp unit LU are abutted against two, left and right, fixing pieces 2c formed on the mirror housing 2 to communicate the mounting holes 5q provided in the fixing pieces 5g with screw holes 2d provided on the mirror housing fixing pieces 2c, and a screw 15, inserted through the mounting hole 5q, is tightened, whereby fixation of the lamp unit LU to the mirror housing 2 is attained.

An edge portion 6h which is a periphery, when viewed from the back side (the swelling side of the mirror housing 2) of the lamp unit LU (lens portion 6), is formed in such a way that a portion in contact with the mirror housing 2 is larger than a second opening H2 when viewed from the back side. Further, because the lamp housing LU is mounted, with the edge portion 6h being in contact with the mirror housing 2 from the swelling side, it can be made larger in lateral dimension.

The upper half on the back face side of the mirror housing 2 is covered with a cover 13 (FIG. 2). The cover 13 is formed separately from the lamp unit LU which is disposed at the lower half of the back face side of the mirror housing 2 and is provided in a manner approximately flush with the lens portion 6 of the lamp unit LU so as to cover the fixing pieces 5g (corresponding to a fixing portion) of the lamp unit LU positioned closer to the front face side than the lens portion 6. Further, because a cover body 13 is mounted on the mirror housing 2 in a manner overlapping the contacting edge of the lamp unit LU from the back-face side, it is possible to securely cover the second opening H2 and improve water proofing characteristics and design characteristics.

In the exemplary embodiment thus structured, the side blinker portion S, to be assembled into the door mirror 1, is structured by assembling the lamp unit LU, which is provided by integrally assembling the lens portion 6 into the outer base 5 covering the front face of the inner base 4 on which the boards 8 and terminal strips 9 are disposed, into the mirror housing 2. Therefore, not only is the structure of the door mirror 1 simplified, but also assembling work into the door mirror 1 becomes easy.

Furthermore, in this instance, when the lamp unit LU, which is a side blinker portion S, is assembled into the mirror housing 2, the lamp unit LU is assembled not from the front face side of the mirror housing 2, namely, the side where the mirror M is disposed, but from the back face side, and is fixed by abutting the fixing pieces 5g to the mirror housing fixing pieces 2c and tightening the screws 15. Consequently, when replacing the lamp unit LU, removing the cover 13 which is formed separately from the lump unit LU leads to the exposure of the fixing pieces 5g. With the fixing pieces 5g thus exposed, the lamp unit LU is removed in a fixed condition without removing the mirror portion M from the mirror housing 2. Thus, the replacement of the lamp unit LU becomes simple and easy. Moreover an improvement in workability is realized and excellent maintenance features are provided.

In other words, the cover 13 serves as a decorative cover which covers and decorates the back side (toward the front of the vehicle) of the mirror housing 2 and at the same time serves as a cover body for covering a fixing portion with respect to the mirror housing 2 of the side blinker portion S. Moreover when mounting a door mirror 1 to a car body which is different in color from other car bodies the same mirror housings 2 and lamp units LU can be commonly used for all car bodies and only the cover 13 needs to have the same color as that of the car body, thereby realizing common use of parts.

In addition, in the embodiment of the invention, the lamp unit LU is structured by abutting the lens portion 6 against the back face side of the base body having the inner base 4 and outer base 5 and integrating the same using resin material 12 injected therebetween. Therefore, the door mirror is excellent in design characteristics and, moreover, excellent in waterproofing characteristics. Thus, it is unnecessary to consider waterproofing characteristics for the attachment to the mirror housing 2, thus resulting in an improvement in workability. Furthermore, in this instance, because the lamp unit LU is fixed to the mirror housing 2 via the fixing pieces 5g mounted on the base body formed with a non-translucent resin material, it is possible to minimize light leakage from the lamp unit LU and provide higher visibility.

Additionally, because on the back face of the mirror housing 2, the cover 13 mounted above the lamp unit LU is formed separately from the lamp unit LU and covers the fixing pieces 5g of the lamp unit LU to prevent exposure to the outside, and moreover, because the cover 13 is approximately flush with the lens portion 6 of the lamp unit LU, excellent design characteristics are provided.

Furthermore, in the present invention, because the edge portion 6h of the lamp unit LU is formed larger than the second opening H2 and the lamp unit LU is mounted, with the edge 6h being in contact with the mirror housing 2 from the swelling side, the lamp unit can be made larger in lateral dimension. Thereby, the lamp unit LU can be easily mounted to result in excellent maintenance features. In addition, because the lamp unit LU larger in lateral dimension is assembled from the swelling side of the mirror housing 2, it is possible to construct a door mirror 1 high in visibility from the front side of a vehicle.

Still further, because the lamp unit LU is provided with a slant portion 6s where the lower edge is slanted toward the upper edge so as to avoid a door-mounting portion so that the shape is more sharply tapered toward the base-end side of the mirror housing 2 and can be assembled in accordance with the lateral dimension of the mirror hosing 2 (along the lateral direction), the light-emitting portion can be made longer laterally to provide a door mirror 1 excellent in visibility.

Thus, in a door mirror into which a lamp body, such as a side blinker is inserted, by only replacing a lamp body due to consumption or breakage of the light source(s) of the lamp body, it is possible to easily replace the lamp body with a new one because the fixing portions are exposed by removing a cover which covers the mirror housing.

What is claimed is:

1. A door mirror equipped with a lamp-body, comprising:
a housing having a mirror side to which a mirror is attached and a swelling side swelling from the mirror side, wherein an opening is formed on the swelling side of the housing; and
a lamp body incorporated onto the housing on the swelling side in a state that the lamp body is in contact with the housing, the lamp body being constructed into a lamp unit by integrating a base body with a lens portion that covers a back face of an inner base, the base body including the inner base that exposes a light source from the back face and has a reflector on the back face and an outer base that covers a front face of the inner base and integrally has a board for supplying power to the light source that is between the inner base and the board, wherein:
the lens portion includes an upper edge that extends straight in a lateral direction, a lower edge that outlines a lower edge of the door mirror, and a slant portion where the lower edge of the lens portion is slanted toward the upper edge of the lens portion so that a shape of the slant portion is more sharply tapered toward a base-end side of the lens portion at a side of a door mounting portion,
the outer base includes a fixing piece that protrudes upward from an upper face portion,
the lamp unit is fixed to the housing from a back face side of the lamp unit in a state that the fixing piece is in contact with the housing from the back face side of the lamp unit while the lamp unit is incorporated onto the housing on the swelling side,
an upper surface of the lamp unit at the back face side of the lamp unit is covered with a cover body, the cover body also covering the fixing piece, and
an outer edge of the slant portion adjacent the door mounting portion matches an outer edge of the housing that is adjacent to the outer edge of the slant portion to create a smooth outline that extends to an outer edge of the cover body adjacent the door mounting the light source includes a plurality of light sources located between the upper edge and the lower edge of the lens portion, the inner base is provided with swelling and protruding portions swelling toward the back face, and the plurality of light sources are located at concave portions that are in the middle of adjacent swelling and protruding portions, and none of the plurality of light sources are located within the slant portion such that the door mounting side is not directly illuminated by the plurality of light sources.

2. The door mirror equipped with a lamp-body as set forth in claim 1, wherein the lamp body is provided horizontally and laterally on a lower half of the housing.

3. The door mirror equipped with a lamp-body as set forth in claim 1, wherein the lamp body is provided flush with the cover body.

4. The door mirror equipped with a lamp-body as set forth in claim 1, wherein the lamp body is provided with a lamp-body bending portion in which a lateral external side is bent toward the mirror side.

5. The door mirror equipped with a lamp-body as set forth in claim 4, wherein the lamp-body bending portion is protruded laterally and outwardly.

6. The door mirror equipped with a lamp-body as set forth in claim 1, wherein the lamp body is provided with a lower face portion which constructs a lower face of the door mirror.

7. The door mirror equipped with a lamp-body as set forth in claim 6, wherein the lower face portion is non-translucent.

8. The door mirror equipped with a lamp-body as set forth in claim 1, wherein the inner base is provided with through-holes passing through the light source for exposure.

9. The door mirror equipped with a lamp-body as set forth in claim 1, wherein the swelling and protruding portions are provided with through-holes on an external face swelled laterally.

10. The door mirror equipped with a lamp-body as set forth in claim 1, wherein through-holes are formed at the concave portions between adjacent swelling and protruding portions.

11. The door mirror equipped with a lamp-body as set forth in claim 1, wherein the inner base is provided with an extending portion having a lateral external side bent toward the mirror side for extension and swelling, and protruding portions are provided on the extending portion.

12. The door mirror equipped with a lamp-body as set forth in claim 8, wherein a plurality of boards are provided in opposition to the through-holes.

13. The door mirror equipped with a lamp-body as set forth in claim 1, wherein the board is composed of a single member.

14. The door mirror equipped with a lamp-body as set forth in claim 1, wherein the inner base is provided with engaging claws for latching the board with an appropriate space left between the board and the front face.

15. The door mirror equipped with a lamp-body as set forth in claim 1, wherein the outer base is non-translucent.

16. The door mirror equipped with a lamp-body as set forth in claim 1, wherein the lens portion comprises a back face portion extending laterally and outwardly from a base-end side and a side face portion bending from the back face to the mirror side and leading to a protruding front end, and the back face portion and the side face portion are provided with a dispersion portion for dispersing light emitted from the light source.

17. The door mirror equipped with a lamp-body as set forth in claim 16, wherein protruded strips are provided at the back face portion in a lateral direction and the protruded strips are provided at the side face portion in a longitudinal direction.

18. The door mirror equipped with a lamp-body as set forth in claim 16, wherein a protruding portion is formed at the side face portion, which protrudes laterally and outwardly in a state continuing from the back face portion.

19. The door mirror equipped with a lamp-body as set forth in claim 1, wherein only a top portion of the inner base is brought into contact with the outer base between the upper edge and the lower edge of the lens portion.

* * * * *